United States Patent

[11] 3,620,239

| [72] | Inventor | Lawrence S. Bright<br>East Granby, Conn. |
|---|---|---|
| [21] | Appl. No. | 847,134 |
| [22] | Filed | Aug. 4, 1969 |
| [45] | Patented | Nov. 16, 1971 |
| [73] | Assignee | Chandler Evans Inc.<br>West Hartford, Conn. |

[54] FLUIDIC ANGULAR POSITION TRANSDUCER
1 Claim, 4 Drawing Figs.

| [52] | U.S. Cl. | 137/81.5 |
|---|---|---|
| [51] | Int. Cl. | F15c 3/12 |
| [50] | Field of Search | 137/81.5, 83; 73/615 |

[56] References Cited
UNITED STATES PATENTS

| 3,004,547 | 10/1961 | Hurvitz | 137/83 |
|---|---|---|---|
| 3,276,463 | 10/1966 | Bowles | 132/81.5 |
| 3,410,289 | 11/1968 | Dexter | 137/81.5 |
| 3,282,283 | 11/1966 | Takeda | 137/83 |
| 3,468,340 | 9/1969 | Camillo | 137/81.5 X |
| 3,495,253 | 2/1970 | Richards | 137/81.5 |
| 3,500,852 | 3/1970 | Bauer | 137/81.5 |
| 3,509,775 | 5/1970 | Evans | 137/81.5 X |
| 3,511,258 | 5/1970 | Palmer | 137/81.5 |
| 3,533,427 | 10/1970 | Chapin | 137/81.5 |

*Primary Examiner*—Samuel Scott
*Attorney*—Radford W. Luther

ABSTRACT: A power stream emanating from a rotatable supply unit is divided between two divergent output channels in a splitter-receiver section. A center dump is interposed between the output channels forming two tapering leading edges upon which the power stream impinges. The pressure differential between the two channels is indicative of the angular position of the supply unit. In a second arrangement an eccentrically mounted cam impedes the flow from two opposed nozzles. The differential pressure upstream of the nozzles is measured by a fluidic proportional amplifier. The upstream pressure differential is a function of the cam's angular position.

INVENTOR
LAWRENCE S. BRIGHT
BY Radford W. Luther
ATTORNEY 3,620,239

FLUIDIC ANGULAR POSITION TRANSDUCER

BACKGROUND OF THE INVENTION

The present invention relates to improvements in fluidic position transducers, and more particularly to angular position transducers. The instant invention further relates to closed loop control systems in which the angular position of a control element influences the control forces exerted thereon.

Countless prior art devices are available for the sensing of linear and angular distance variations. Such devices include the well-known potentiometer and synchro.

The difficulty with most prior art devices is that in certain adverse environments reliability is impaired.

Fluid systems, in contradistinction to their electronic counterparts, are advantageous in that they are capable of reliable operation over wide temperature ranges and during exposure to severe vibration. As missile control systems are frequently subjected to strong vibrations, fluidic components are particularly suitable for inclusion in such systems.

SUMMARY OF THE INVENTION

According to this invention, angular rotation and linear movement of an element is converted into a fluid signal which may be directed to other fluidic components in a control system or measured directly by a suitable device. In one embodiment, angular rotation of a power stream unit produces unequal flows in two output channels. The differential signal created by the unequal flows is generally proportional to the extent of angular rotation of the power stream unit. In another embodiment, fluid flowing from orifices of two channels is impeded by a rotatable cam. Rotation of the cam varies the distance between the orifices and the cam to effect a pressure differential in the channels which is a known function of the angular position of the cam. Briefly stated, the novel concept of the latter embodiment is relating the movement of an element to the differential flow brought about thereby.

Accordingly, it is a primary object of the invention to provide a fluidic device for sensing displacement, and more particularly angular displacement.

It is another object of the invention to provide a fluidic device which converts movement to a proportional fluid signal.

It is a further object of the invention to provide a fluidic means to measure the angular displacement of a control element on a missile.

Yet another object of the invention is to provide an angular movement measuring device that will have greater reliability than prior art devices.

These and other objects will be more fully understood from the following detailed description taken in connection with the accompanying drawings.

DESCRIPTION OF THE PREFERRED EMBODIMENTS

Figure 1:
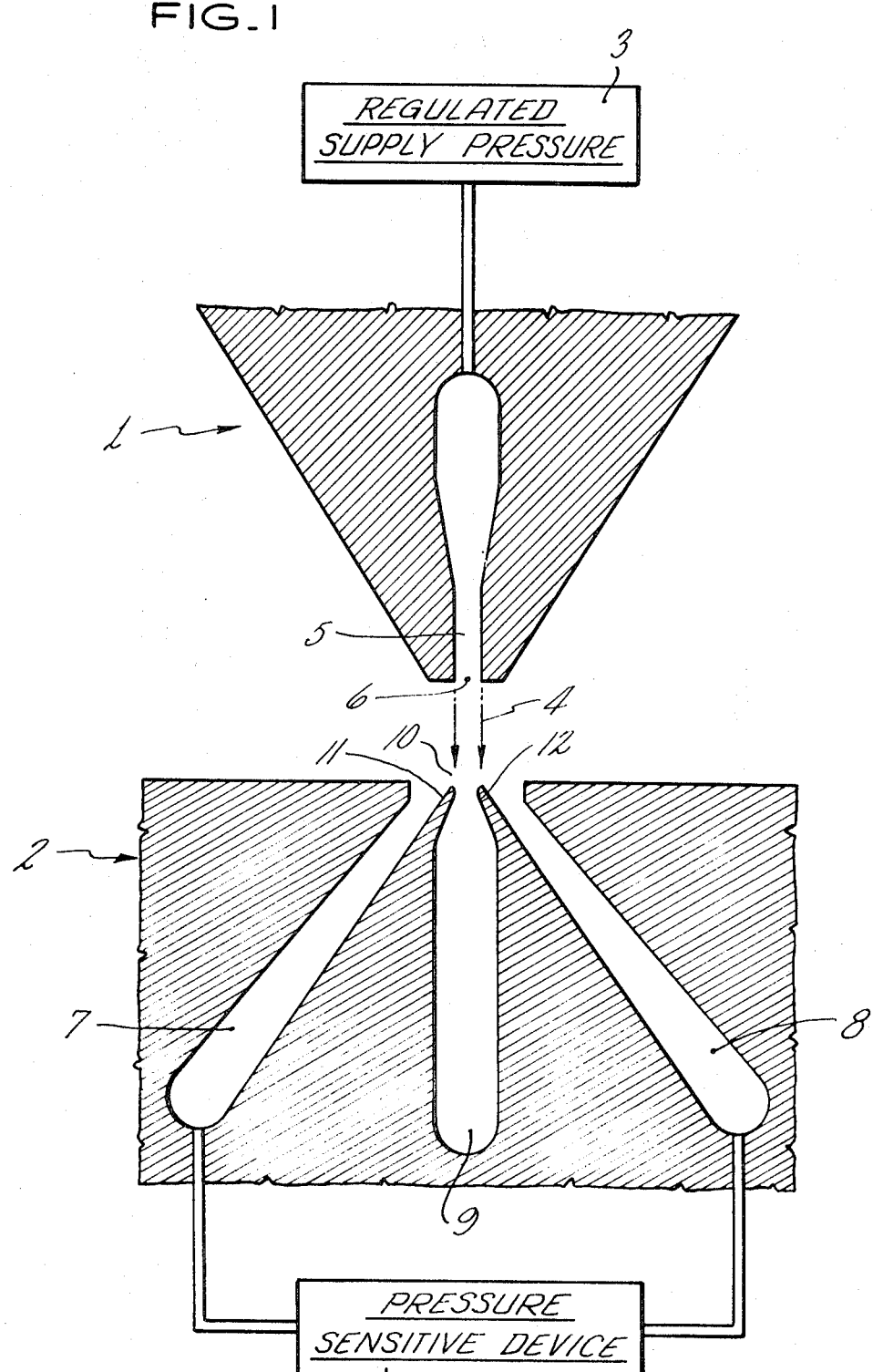
FIG. 1 is a schematic diagram of an angular position transducer incorporating the present invention.

Referring now to the drawings, there is shown in FIG. 1 fluidic angular position transducer which includes a main supply jet unit and a splitter-receiver unit generally indicated at 1 and 2 respectively. Air is supplied at a fixed pressure from a source 3 to the main supply jet unit 1 where a high-velocity power stream is created subsequent to passage through a venturi and discharge passage 5. The main supply jet unit 1 is rotatably mounted at pivot 6 opposite the splitter-receiver unit 2.

Located in splitter-receiver unit 2 are two divergent receiving channels 7 and 8, with a center dump 9, which discharges fluid to the atmosphere, positioned therebetween. The inlet orifice 10 defined by the receiving channels and the center dump includes two leading edges 11 and 12 which each curve inwardly toward the center dump and taper in the direction of the main supply jet unit 1, terminating in a rounded tip. The leading edge design shown at 11 and 12 tends to minimize the disturbance caused by the interaction of the power stream and the leading edges when the main jet supply unit is rotated from the neutral position illustrated in FIG. 1. A pressure-sensitive device 13 is connected to receiving channels 7 and 8 for measuring the differential pressure therebetween.

In operation, the power stream 4 passes across the space between units 1 and 2 and arrives at the inlet orifice 10. If the main supply jet unit 1 has not been angularly displaced from its neutral position, the power stream will be virtually wholly received by the center dump 9 and subsequently discharged to the atmosphere. Upon angular rotation of main supply jet unit 1, the power stream will be divided between the center dump 9 and one of the receiving channels 7 and 8, depending on the direction of the angular rotation, thereby effecting a pressure differential between the receiver channels 7 and 8 which is measured by the pressure-sensitive device 13, which may be a fluidic proportional amplifier. Since the pressure differential between the channels is generally proportional to the degree of angular rotation of the main jet supply unit 1, a signal or measurement obtained from the pressure sensitive device 13 will be indicative of the supply unit's angular rotation.

In order to prevent a dead band in the neutral region of the main supply jet unit 1, the width of the power stream should be slightly larger than the entrance to the center dump.

Figures 2, 2A, 2B:
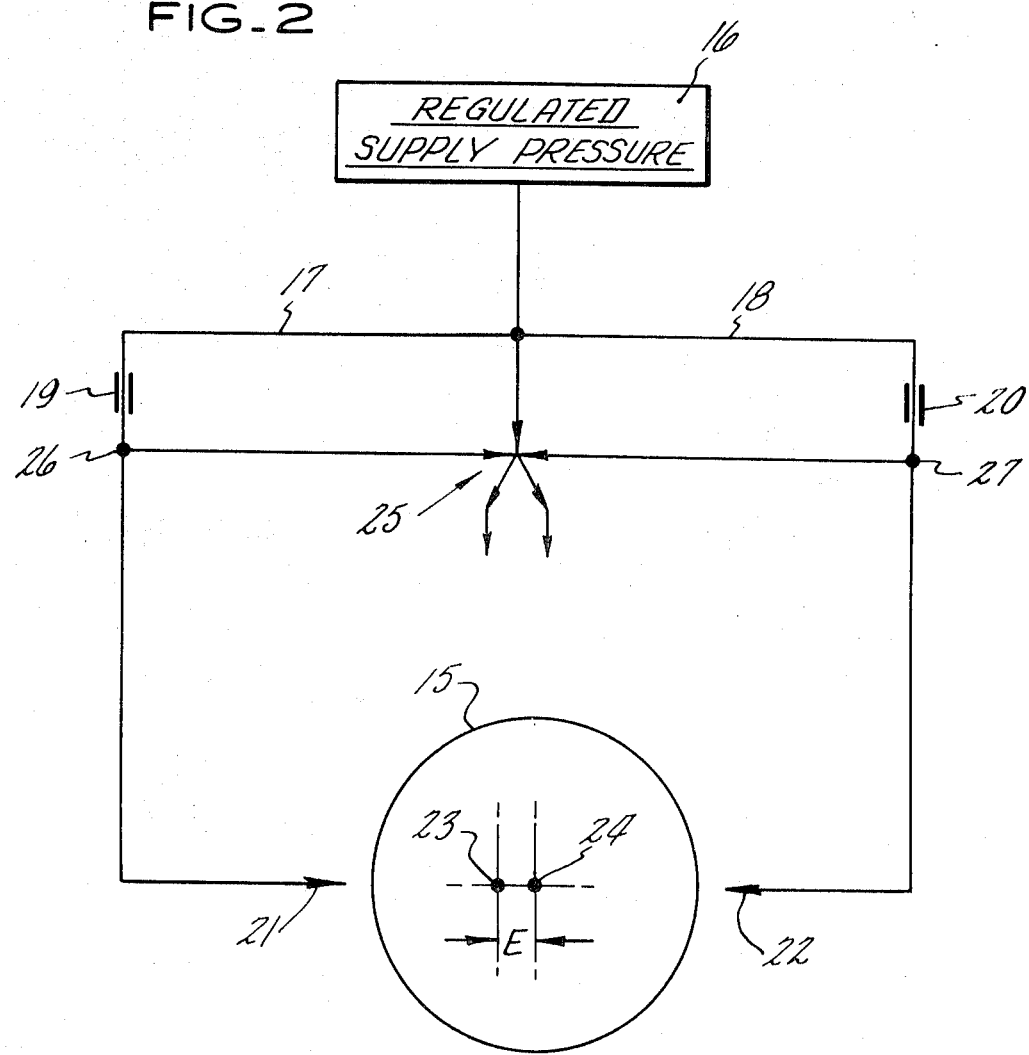
FIG. 2 is a schematic diagram of another angular position transducer, in accordance with the invention, which includes an eccentric cam.
FIGS. 2a and 2b show alternative forms of the cam of FIG. 2.

Turning now to FIG. 2, there is shown an angular position transducer which utilizes an eccentrically mounted cam 15 to generate a differential pressure. A source of pressurized fluid 16 communicates with two channels or conduits 17 and 18 which contain identical flow restrictors 19 and 20. Channels 17 and 18 terminate in nozzles or orifices respectively designated at 21 and 22. The cam 15 is rotatably mounted at point 23 which is spaced a distance E from the cam's geometric center 24. The cam, shown in FIG. 2, is essentially a cylinder. The nozzles 21 and 22 are both equidistant from the periphery of the cam when it is in the neutral position, which is illustrated in FIG. 2. The spacing between the nozzles and the cam must be such that flow from the nozzles will always be impeded by the cam throughout the desired angular displacement thereof.

A fluidic proportional amplifier 25 is interconnected between channels 17 and 18 downstream of restrictors 19 and 20 to generate a signal proportional to the differential pressure therebetween. A flow tapped from the channels at port 26 and 27 serves as the control jet while the power stream is supplied from source 16.

When cam 15 is angularly displaced from its neutral position, shown in FIG. 2, the clearance between nozzle 21 and the cam will decrease, and the clearance between nozzle 22 and the cam will increase. This displacement will occasion a reduction in the flow through restrictor 19 and an increase in flow through restrictor 20, thus effecting a differential pressure between ports 26 and 27 which are downstream of the restrictors. This differential pressure is detected by the fluidic proportional amplifier which produces an output signal proportional thereto. The signal from the amplifier is adaptable for direct measurement or transmission to other fluidic components. Since the pressure differential between the ports 26 and 27 is proportional to the angular displacement of the cam, the signal produced by the amplifier will also be proportional to the cam's angular displacement.

In applications involving the angular displacement of a control element about a null position, the neutral position of the cam should be referenced to an outer limit of movement from the null, as the embodiment of FIG. 2 is adapted to measure absolute displacement from the neutral cam position.

In order to accomplish the proportional operation discussed heretofore, it is necessary to keep the eccentricity E of the cam 15 small with respect to the diameter thereof. If the E is too large, proportional operation will only be possible within small angular displacements.

The circular cam shown in FIG. 2 could readily be replaced with a cam shaped as an irregular solid 28 (FIG. 2A) to generate a signal at amplifier 25 which would be a function of the cam's angular position. The desired functional relationship between angular position and output signal would dictate the cam's design and eccentricity.

The device of FIG. 2 could be further modified by connecting a suitably shaped cam to a motor. The angular velocity imparted to the cam by the motor would permit the device to perform as a function generator (e.g., an oscillator, sawtooth or square wave generator).

It would also be possible to replace the rotatable cam of FIG. 2 with a generally wedge-shaped member 30 (FIG. 2b) illustrated in the form of a right triangle mounted for translation in a vertical direction, which would generate an output signal at 25 that would be proportional to the member's vertical displacement. Of course, it will be understood that the member could be of such a shape to produce an output signal at 25 that would be a nonlinear function of the cam's position.

Obviously various changes and modifications may be made in the particular illustrative embodiments of my invention without departing from the scope or spirit of the invention.

I claim:

1. A fluidic angular position transducer, comprising:

a main supply jet unit including a discharge passage for producing a high-velocity power stream;

a splitter-receiver unit displaced from said main supply unit, said splitter-receiver unit including:

a pair of divergent receiving channels respectively located at opposite sides of the normal axis of the power stream, said receiving channels each having a convergent inlet portion and a divergent portion downstream of said inlet portion, and a center dump disposed between said receiving channels, said center dump having a restriction at its inlet, said restriction being defined by a pair of converging wall portions, said wall portions terminating at their upstream ends in rounded leading edges, said rounded edges each communicating with a further wall portion which diverges away from the power stream normal axis to define in part the convergent inlet portion of one of said receiving channels;

means mounting the main supply jet unit for rotation about an axis aligned with and transverse to the axis of the center dump, the axes of said supply jet unit discharge passage and the center dump being aligned with the supply jet unit in its normal unrotated position; and a pressure-sensitive device operatively connected to the divergent portions of said receiving channels to measure the pressure differential therebetween to thereby provide an indication of the angular position of the main supply jet unit.

* * * * *